United States Patent
Lee et al.

(10) Patent No.: US 10,805,869 B2
(45) Date of Patent: Oct. 13, 2020

(54) TECHNIQUES AND APPARATUSES FOR SEARCH, MEASUREMENT, AND ICON DISPLAY IN NEW RADIO NON-STANDALONE MODE

(71) Applicant: QUALCOMM Incorporated, San Diego, CA (US)

(72) Inventors: Kuo-Chun Lee, San Diego, CA (US); Arvind Vardarajan Santhanam, San Diego, CA (US); Srinivasan Balasubramanian, San Diego, CA (US); Reza Shahidi, San Diego, CA (US); Aziz Gholmieh, Del Mar, CA (US); Yongsheng Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 16/109,262

(22) Filed: Aug. 22, 2018

(65) Prior Publication Data
US 2019/0069229 A1    Feb. 28, 2019

Related U.S. Application Data

(60) Provisional application No. 62/550,298, filed on Aug. 25, 2017.

(51) Int. Cl.
*H04W 48/16* (2009.01)
*H04W 48/18* (2009.01)
(Continued)

(52) U.S. Cl.
CPC ........... *H04W 48/16* (2013.01); *H04W 48/18* (2013.01); *H04W 88/06* (2013.01); *H04W 24/10* (2013.01);
(Continued)

(58) Field of Classification Search
None
See application file for complete search history.

(56) References Cited

U.S. PATENT DOCUMENTS 6,751,472 B1 *  6/2004  Muhonen ............... H04W 88/02
                                                  370/329
7,295,840 B2 * 11/2007  Ormson ................. H04W 48/16
                                                  455/434
(Continued)

FOREIGN PATENT DOCUMENTS

EP      2249609 A1    11/2010
EP      2466946 A1     6/2012
(Continued)

OTHER PUBLICATIONS

International Search Report and Written Opinion—PCT/US2018/047683—ISA/EPO—dated Oct. 12, 2018.

*Primary Examiner* — Ayaz R Sheikh
*Assistant Examiner* — Tarell A Hampton
(74) *Attorney, Agent, or Firm* — Qualcomm Incorporated

(57) ABSTRACT

Certain aspects of the present disclosure generally relate to wireless communication. In some aspects, a user equipment (UE) may camp on a cell of a first radio access technology (RAT). The UE may perform a cell search for a second RAT while camped on the cell of the first RAT, wherein the second RAT operates in a non-standalone mode with the first RAT. The UE may present, for display, an indication of whether the second RAT is available in the cell based at least in part on performing the cell search for the second RAT. Numerous other aspects are provided.

30 Claims, 11 Drawing Sheets

(51) Int. Cl.
*H04W 88/06* (2009.01)
*H04W 36/00* (2009.01)
*H04W 24/10* (2009.01)
*H04W 48/20* (2009.01)

(52) U.S. Cl.
CPC ........ *H04W 36/0085* (2018.08); *H04W 48/20* (2013.01)

(56) References Cited

U.S. PATENT DOCUMENTS

| | | | | |
|---|---|---|---|---|
| 8,010,107 | B1* | 8/2011 | Lundy | H04W 36/36 |
| | | | | 370/328 |
| 9,313,700 | B2* | 4/2016 | Pu | H04W 36/0083 |
| 9,392,471 | B1* | 7/2016 | Thomas | H04W 36/0083 |
| 10,127,792 | B1* | 11/2018 | Troy | H04W 4/70 |
| 10,241,641 | B1* | 3/2019 | Thantharate | H04W 36/14 |
| 2004/0192296 | A1* | 9/2004 | Ohmori | H04W 48/18 |
| | | | | 455/432.1 |
| 2007/0078981 | A1 | 4/2007 | Alberth, Jr. et al. | |
| 2008/0153486 | A1* | 6/2008 | Ramkull | H04W 48/18 |
| | | | | 455/434 |
| 2009/0073933 | A1* | 3/2009 | Madour | H04W 12/0602 |
| | | | | 370/331 |
| 2009/0088159 | A1* | 4/2009 | Wu | H04W 36/14 |
| | | | | 455/436 |
| 2009/0104905 | A1* | 4/2009 | DiGirolamo | H04J 11/0093 |
| | | | | 455/434 |
| 2009/0116568 | A1* | 5/2009 | Lindoff | H04B 7/086 |
| | | | | 375/260 |
| 2009/0124224 | A1* | 5/2009 | Hildebrand | H04J 11/0069 |
| | | | | 455/150.1 |
| 2009/0137267 | A1* | 5/2009 | Nader | H04B 17/382 |
| | | | | 455/552.1 |
| 2010/0167714 | A1* | 7/2010 | Howarter | H04M 1/72577 |
| | | | | 455/418 |
| 2010/0273517 | A1* | 10/2010 | Pinheiro | H04B 1/036 |
| | | | | 455/522 |
| 2011/0034168 | A1* | 2/2011 | Lindoff | H04J 11/0086 |
| | | | | 455/434 |
| 2012/0052911 | A1* | 3/2012 | Chin | H04W 4/60 |
| | | | | 455/558 |
| 2012/0184253 | A1* | 7/2012 | Hsu | H04W 4/00 |
| | | | | 455/414.1 |
| 2012/0244814 | A1* | 9/2012 | Okayasu | H04M 1/6066 |
| | | | | 455/41.3 |
| 2013/0157662 | A1* | 6/2013 | Han | H04W 48/18 |
| | | | | 455/436 |
| 2013/0258999 | A1* | 10/2013 | De Pasquale | H04W 36/24 |
| | | | | 370/331 |
| 2014/0087740 | A1* | 3/2014 | Nakamura | H04W 36/14 |
| | | | | 455/444 |
| 2014/0099949 | A1* | 4/2014 | Godor | H04W 52/0206 |
| | | | | 455/434 |
| 2014/0335862 | A1 | 11/2014 | Wang et al. | |
| 2015/0063295 | A1* | 3/2015 | Himayat | H04W 36/0022 |
| | | | | 370/331 |
| 2015/0097689 | A1* | 4/2015 | Logue | G08B 25/003 |
| | | | | 340/632 |
| 2015/0271718 | A1* | 9/2015 | Gopal | H04W 36/0088 |
| | | | | 455/436 |
| 2016/0050643 | A1* | 2/2016 | Pudney | H04W 68/02 |
| | | | | 455/450 |
| 2016/0119797 | A1* | 4/2016 | Das | H04W 24/02 |
| | | | | 370/252 |
| 2016/0142467 | A1* | 5/2016 | Ban | H04L 67/02 |
| | | | | 709/219 |
| 2016/0157142 | A1* | 6/2016 | Koskinen | H04W 36/0066 |
| | | | | 370/331 |
| 2017/0060654 | A1* | 3/2017 | Nandakumar | G06F 11/079 |
| 2017/0111886 | A1 | 4/2017 | Kim et al. | |
| 2017/0181042 | A1* | 6/2017 | Dash | H04W 36/0022 |
| 2018/0004394 | A1* | 1/2018 | Liu | G06F 3/04817 |
| 2018/0054346 | A1* | 2/2018 | Hambridge | H04L 67/327 |
| 2018/0192443 | A1* | 7/2018 | Novlan | H04W 74/006 |
| 2018/0288679 | A1* | 10/2018 | Hessler | H04W 28/0231 |
| 2018/0359017 | A1* | 12/2018 | Kwon | H04B 7/0689 |
| 2019/0349906 | A1* | 11/2019 | Futaki | H04W 36/14 |
| 2020/0029238 | A1* | 1/2020 | Si | H04L 1/1614 |

FOREIGN PATENT DOCUMENTS

| | | | | |
|---|---|---|---|---|
| EP | 2958375 A2 | | 12/2015 | |
| WO | WO-2008058360 A1 * | | 5/2008 | ........ H04M 1/72519 |
| WO | 2016060796 A1 | | 4/2016 | |
| WO | WO-2016116145 A1 * | | 7/2016 | ............ H04W 36/04 |

* cited by examiner

TECHNIQUES AND APPARATUSES FOR SEARCH, MEASUREMENT, AND ICON DISPLAY IN NEW RADIO NON-STANDALONE MODE

CROSS-REFERENCE TO RELATED APPLICATIONS UNDER 35 U.S.C. § 119

This application claims priority to Provisional Patent Application No. 62/550,298, filed Aug. 25, 2017, entitled "TECHNIQUES AND APPARATUSES FOR SEARCH, MEASUREMENT, AND ICON DISPLAY IN NEW RADIO NON-STANDALONE MODE," which is hereby expressly incorporated by reference herein.

FIELD OF THE DISCLOSURE

Aspects of the present disclosure generally relate to wireless communication, and more particularly to techniques and apparatuses for search, measurement, and icon display in New Radio non-standalone mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may be performed by a user equipment (UE). The method may include camping on a cell of a first radio access technology (RAT); performing a cell search for a second RAT while camped on the cell of the first RAT, wherein the second RAT operates in a non-standalone mode with the first RAT; and presenting, for display, an indication of whether the second RAT is available in the cell based at least in part on performing the cell search for the second RAT.

In some aspects, a user equipment for wireless communication may include memory and one or more processors operatively coupled to the memory. The memory and the one or more processors may be configured to camp on a cell of a first radio access technology (RAT); perform a cell search for a second RAT while camped on the cell of the first RAT, wherein the second RAT operates in a non-standalone mode with the first RAT; and present, for display, an indication of whether the second RAT is available in the cell based at least in part on performing the cell search for the second RAT.

In some aspects, an apparatus for wireless communication may include means for camping on a cell of a first radio access technology (RAT); means for performing a cell search for a second RAT while camped on the cell of the first RAT, wherein the second RAT operates in a non-standalone mode with the first RAT; and means for presenting, for display, an indication of whether the second RAT is available in the cell based at least in part on performing the cell search for the second RAT.

In some aspects, a non-transitory computer-readable medium may store one or more instructions for wireless communication. The one or more instructions, when executed by one or more processors, may cause the one or more processors to camp on a cell of a first radio access technology (RAT); perform a cell search for a second RAT while camped on the cell of the first RAT, wherein the second RAT operates in a non-standalone mode with the first RAT; and present, for display, an indication of whether the second RAT is available in the cell based at least in part on performing the cell search for the second RAT.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
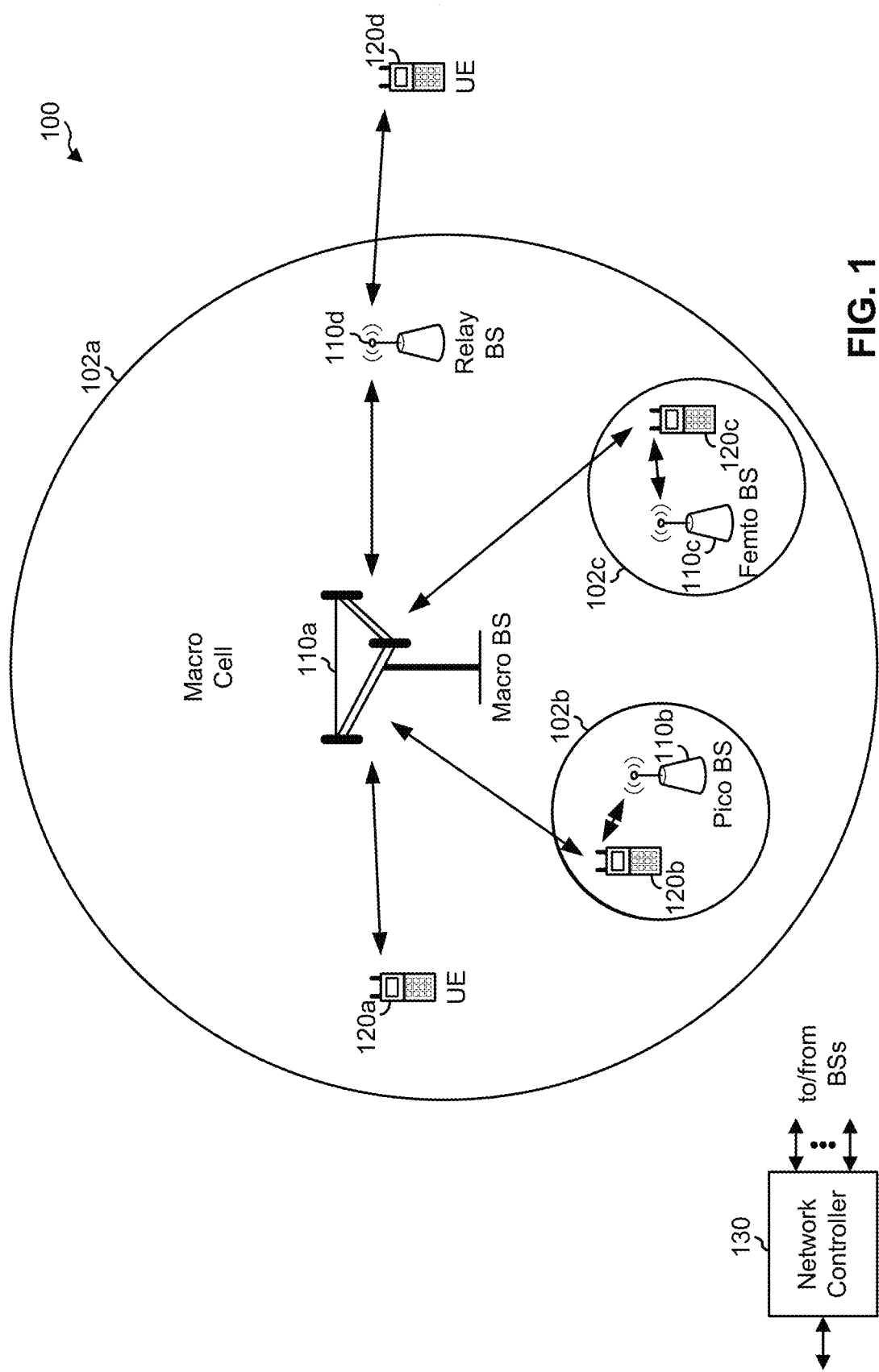
FIG. 1 is a block diagram conceptually illustrating an example of a wireless communication network, in accordance with certain aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used. In some aspects, the base station 110 may provide coverage using a first radio access technology (RAT), such as a 4G/LTE RAT, to anchor a UE to a core network (e.g., that includes network controller 130). Additionally, or alternatively, the base station 110 may increase throughput by adding one or more carriers of a second RAT, such as a 5G/NR RAT, to a connection with the UE. The second RAT may operate in a non-standalone (NSA) mode with the first RAT.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
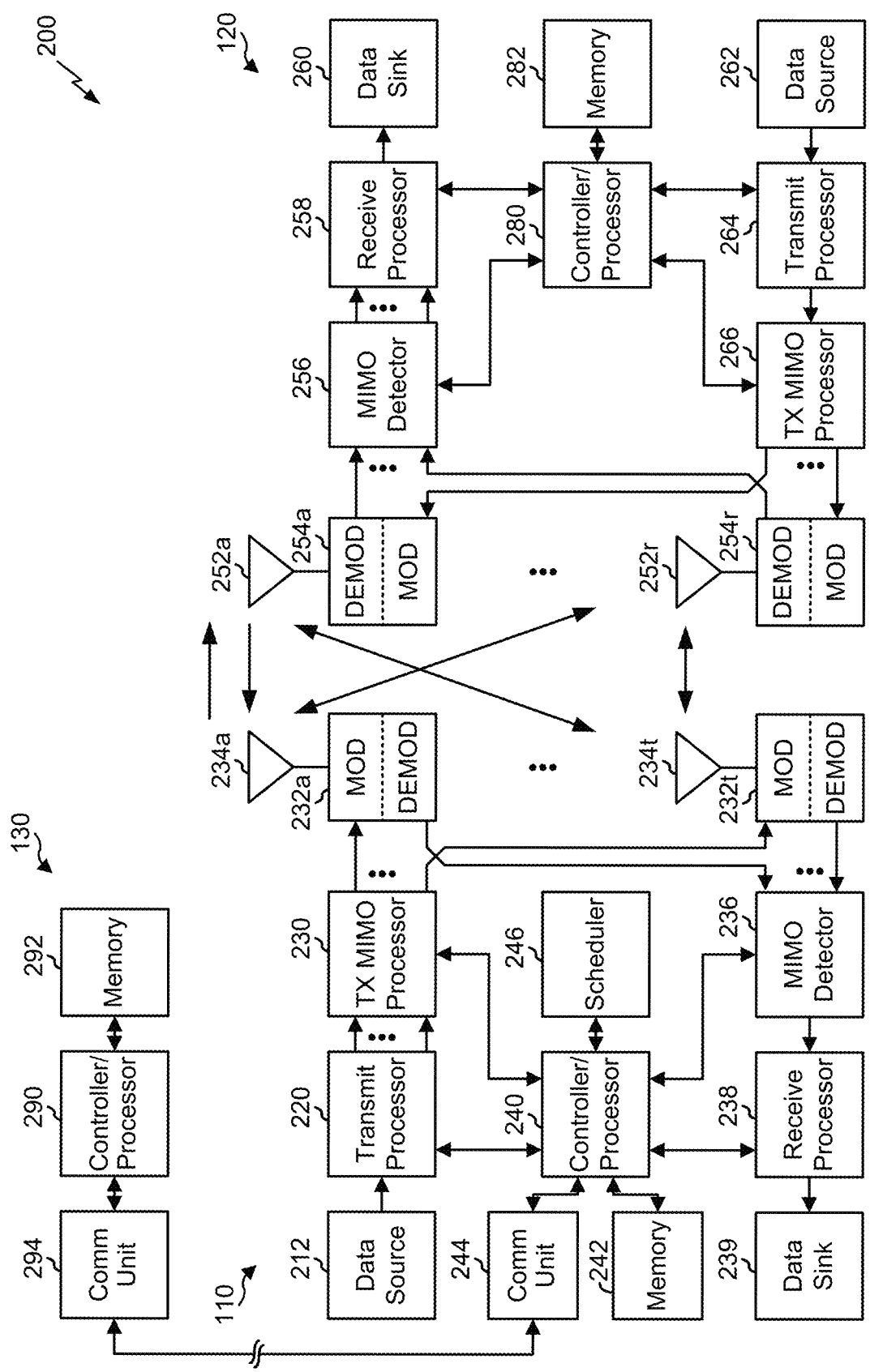
FIG. 2 is a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to perform search, measurement, and icon display in New Radio non-standalone mode. For example, controller/processor 280 and/or other processors and modules at UE 120, may perform or direct operations of UE 120 to perform search, measurement, and icon display in New Radio non-standalone mode. For example, controller/processor 280 and/or other controllers/processors and modules at UE 120 may perform or direct operations of, for example, process 1100 of FIG. 11 and/or other processes as described herein. In some aspects, one or more of the components shown in FIG. 2 may be employed to perform example process 1100 and/or other processes for the techniques described herein. Memories 242 and 282 may store data and program codes for base station 110 and UE 120, respectively. A scheduler 246 may schedule UEs for data transmission on the downlink and/or uplink.

In some aspects, the UE 120 may include means for camping on a cell of a first RAT, means for performing a cell search for a second RAT while camped on the cell of the first RAT, means for presenting, for display, an indication of whether the second RAT is available in the cell, and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3:
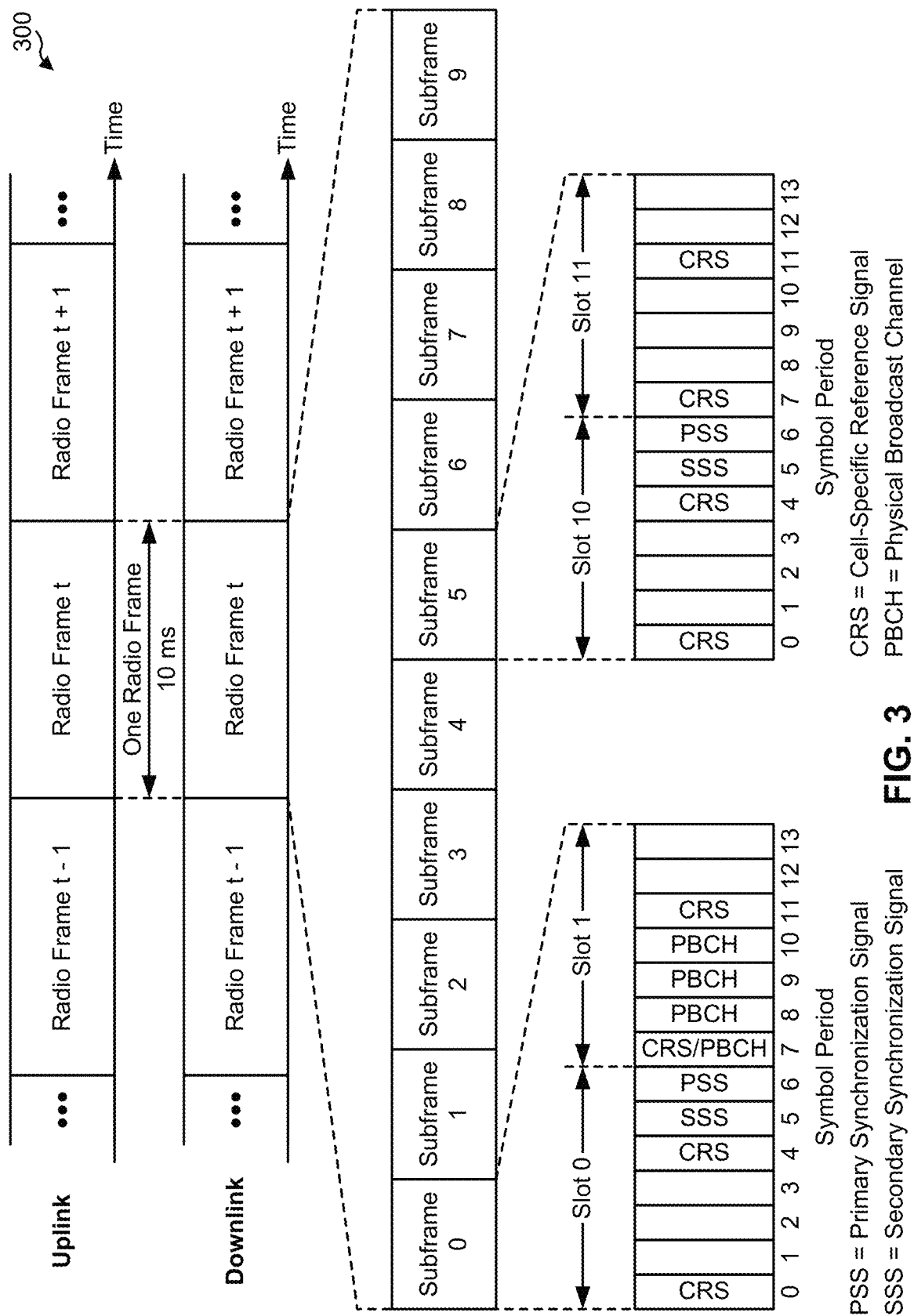
FIG. 3 is a block diagram conceptually illustrating an example of a frame structure in a wireless communication network, in accordance with certain aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2 L symbol periods in each subframe may be assigned indices of 0 through 2 L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
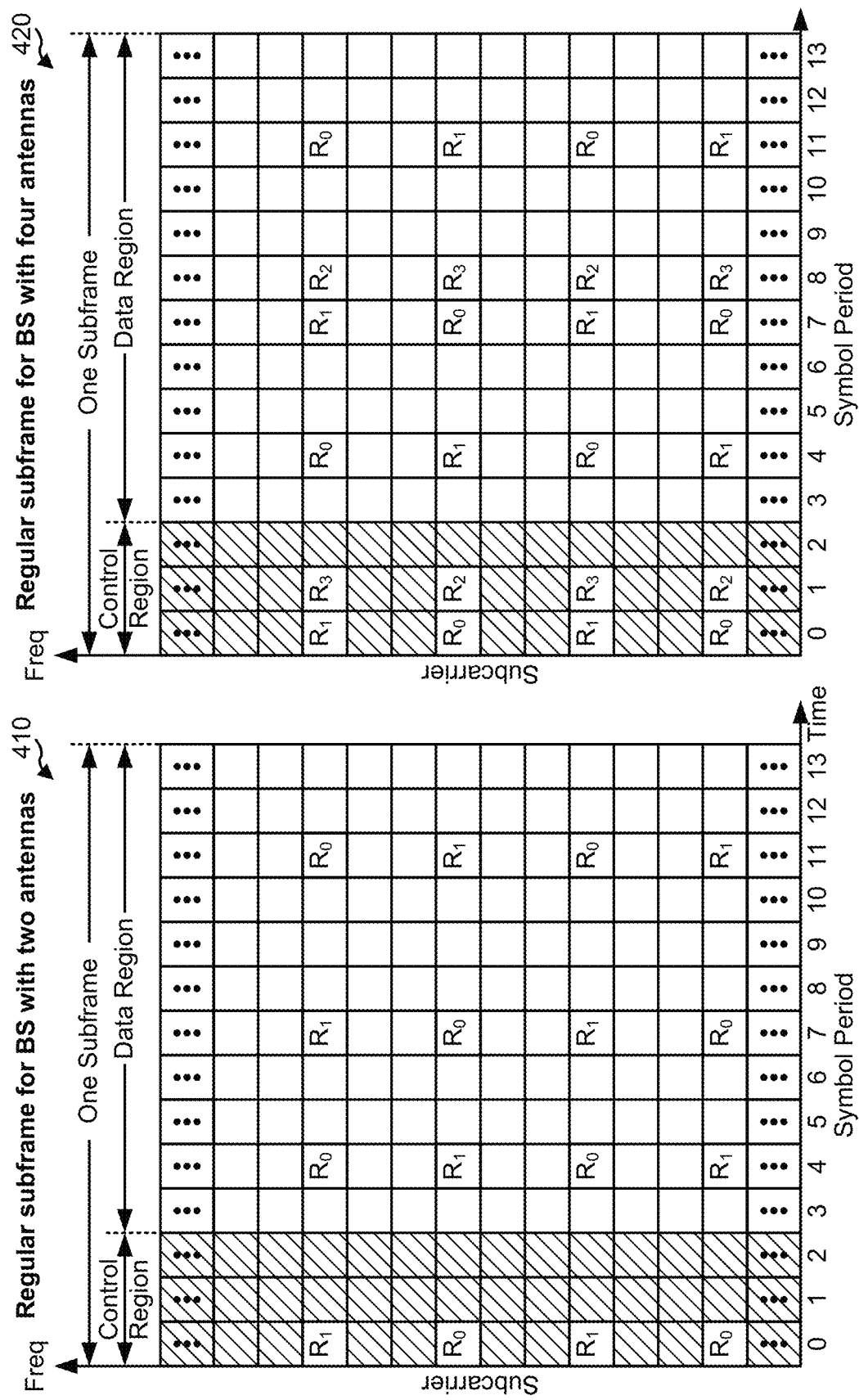
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q E {0, . . . , Q−1}.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
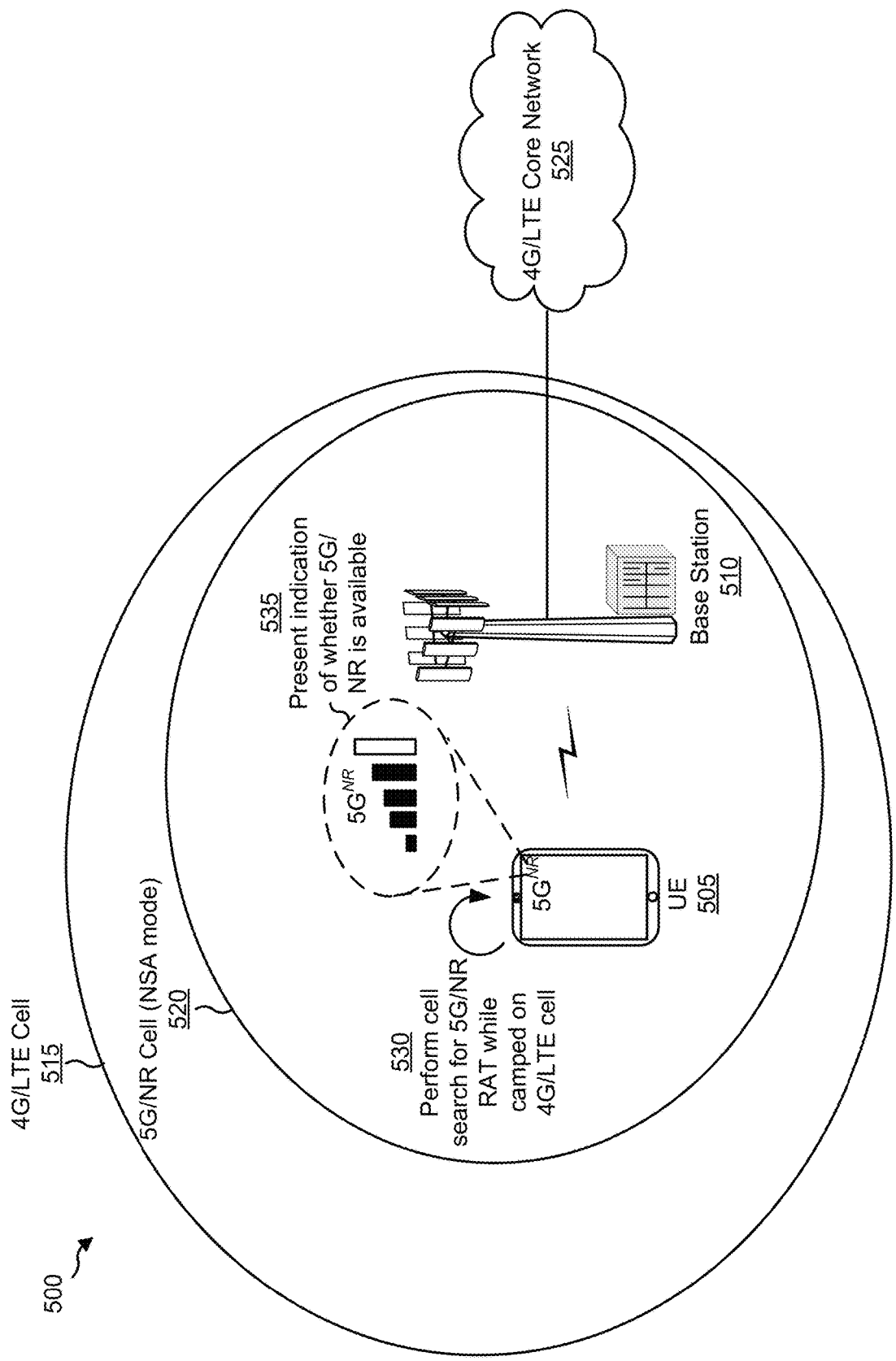
FIGS. 5-10 are diagrams illustrating examples of search, measurement, and icon display in New Radio non-standalone mode, in accordance with various aspects of the present disclosure.

FIG. 5 is a diagram illustrating an example 500 of search, measurement, and icon display in New Radio non-standalone mode, in accordance with various aspects of the present disclosure. As shown in FIG. 5, a UE 505 may communicate with a base station 510. In some aspects, the UE 505 may correspond to one or more UEs described elsewhere herein, such as the UE 120 and/or the like. Additionally, or alternatively, the base station 510 may correspond to one or more base stations described elsewhere herein, such as the base station 110 and/or the like.

As further shown in FIG. 5, the UE 505 may be camped on a first cell 515 of a first radio access technology (RAT), shown as a 4G/LTE RAT (sometimes referred to herein as an LTE RAT, a 4G RAT, or a 4G/LTE RAT). The base station 510 may provide network access via the 4G/LTE cell, and may provide additional network access (e.g., to increase throughput) via a second cell 520 of a second RAT, shown as a 5G/NR RAT (sometimes referred to herein as an NR RAT, a 5G RAT, or a 5G/NR RAT). The NR RAT may operate in a non-standalone (NSA) mode with the LTE RAT. In some aspects, operating in the non-standalone mode means that the LTE cell is used as a master cell group for the UE 505, and one or more NR cells may be added as additional carriers on one or more secondary cell groups for the UE 505. Additionally, or alternatively, in the non-standalone mode, a 4G/LTE core network 525 may be used. In some aspects, the LTE cell may anchor a network connection between the UE 505 and the core network 525 (e.g., for mobility, coverage, and/or the like), and one or more NR cells may be added as additional carriers to increase throughput.

When the NR RAT operates in the non-standalone mode with the LTE RAT, a user of the UE 505 and/or an application executing on the UE 505 may need to determine whether the NR RAT is available in the LTE cell and/or may need to determine a signal strength associated with the NR RAT in the LTE cell. In some cases, the base station 510 may broadcast system information that indicates whether the NR RAT is available in the LTE cell (e.g., in SIB1 or some other SIB), may broadcast system information that indicates one or more 5G/NR frequencies available in the cell (e.g., in a SIB, such as SIB22 or another SIB), and/or the like. However, in some cases, such system information may be unavailable, such as when a network operator cannot implement this system information in a legacy 4G/LTE system. Thus, the UE 505 may need to perform a search and measurement procedure for an NR cell when camped on an LTE cell. In this way, the UE 505 may determine whether an NR RAT is available on the LTE cell and/or may determine a signal strength associated with the NR RAT when the NR RAT is operating in a non-standalone mode with the LTE RAT. Additionally, or alternatively, the UE 505 may indicate such availability and/or signal strength to a user, such as by presenting an indication for display on the UE 505.

As shown by reference number 530, the UE 505 may perform a cell search for a second RAT (e.g., a 5G/NR RAT) when camped on a cell of a first RAT (e.g., a 4G/LTE RAT) and when the second RAT operates in a non-standalone mode with the first RAT. This cell search is described in more detail elsewhere herein.

As shown by reference number 535, the UE 505 may present, for display, an indication of whether the second RAT (e.g., the 5G/NR RAT) is available in the cell of the first RAT (e.g., the 4G/LTE cell) based at least in part on performing the cell search for the second RAT. For example, and as shown, the UE 505 may display an indication that the 5G/NR RAT is available on the cell (e.g., using an icon that shows $5G^{NR}$ and/or the like), and/or may display a signal strength indicator associated with the 5G/NR RAT. Additional details are described elsewhere herein.

By performing a 5G-specific search and/or measurement when camped on a 4G cell, the UE 505 may determine 5G availability and/or signal strength when operating in a 5G non-standalone mode. As described in more detail elsewhere herein, the UE 505 may maintain various lists to increase efficiency and reduce power consumption associated with determining 5G availability and/or signal strength in the non-standalone mode.

As indicated above, FIG. 5 is provided merely as an example. Other examples are possible and may differ from what was described with regard to FIG. 5.

Figure 6:
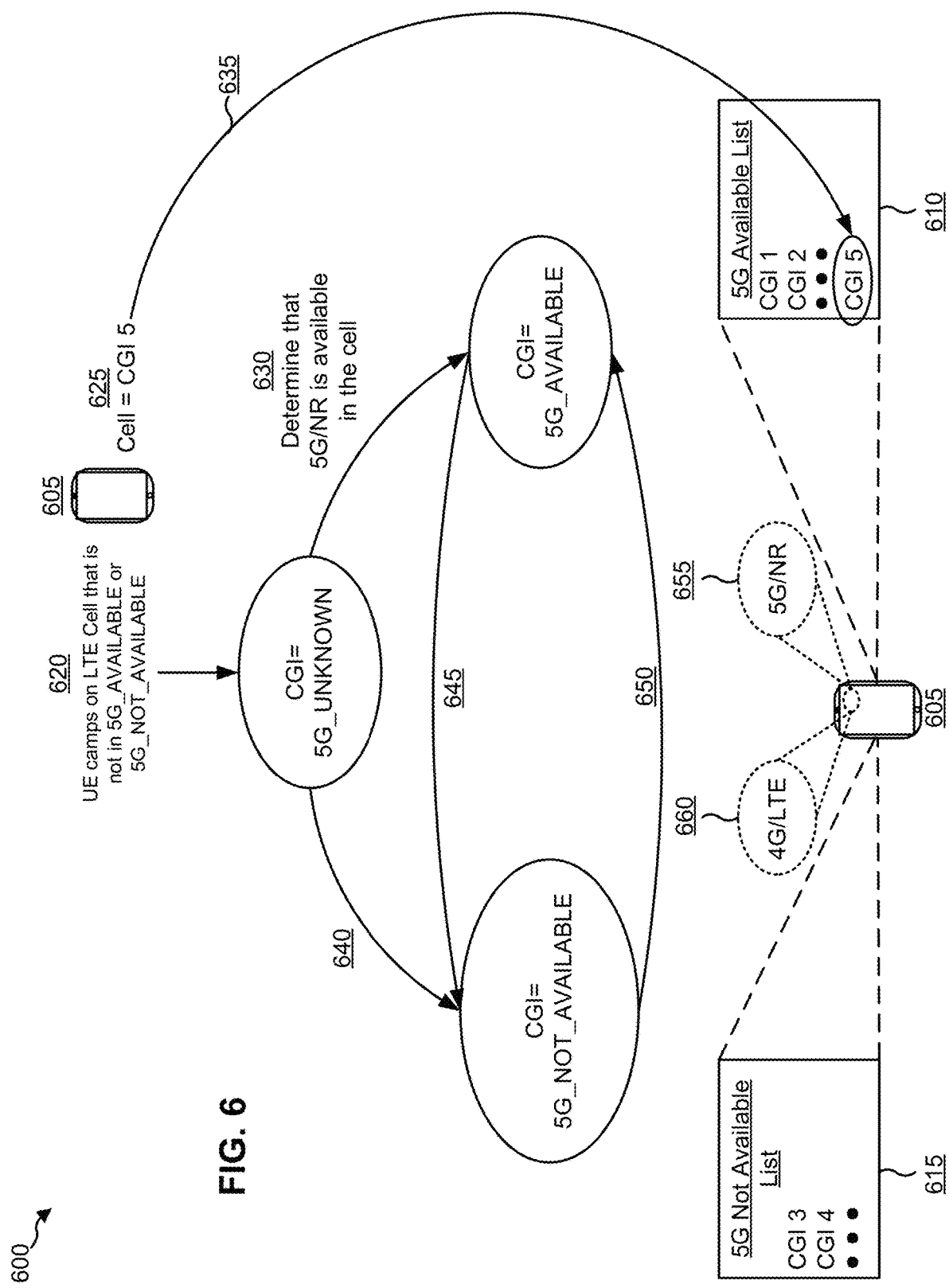

FIG. 6 is a diagram illustrating another example 600 of search, measurement, and icon display in New Radio non-standalone mode, in accordance with various aspects of the present disclosure. As shown in FIG. 6, a UE 605 may store one or more lists to increase efficiency and reduce power consumption associated with determining 5G availability and/or signal strength in the non-standalone mode. In some aspects, the UE 605 may correspond to one or more UEs described elsewhere herein, such as the UE 120, the UE 505, and/or the like.

As shown in FIG. 6, the UE 605 may store a first list 610 (e.g., a 5G AVAILABLE list) that identifies one or more cells of the first RAT (e.g., the LTE RAT) in which the second RAT (e.g., the NR RAT) is available. In some aspects, a cell global identity (CGI) may be stored in the first list 610 to identify a cell of the first RAT. For example, when the second RAT is determined to be available in a cell of the first RAT, a CGI that identifies the cell of the first RAT may be stored in the first list 610.

Additionally, or alternatively, the UE 605 may store a second list 615 (e.g., a 5G NOT AVAILABLE list) that identifies one or more cells of the first RAT (e.g., the LTE RAT) in which the second RAT (e.g., the NR RAT) is unavailable. In some aspects, a CGI may be stored in the second list 615 to identify a cell of the first RAT. For example, when the second RAT is determined to be unavailable in a cell of the first RAT, a CGI that identifies the cell of the first RAT may be stored in the second list 615.

As shown by reference number 620, the UE 605 may camp on a cell of the first RAT (e.g., an LTE cell). The UE 605 may determine whether the cell is identified in the first list 610 or the second list 615. As shown by reference number 625, the cell may be identified by an example CGI of "CGI 5." The UE 605 may determine that the CGI of the cell is not included in the first list 610 or the second list 615, and may proceed to determine whether the second RAT is available in the cell based at least in part on determining that the CGI is not included in the first list 610 or the second list 615.

As shown by reference number 630, in example 600, the UE 605 determines that the second RAT is available in the cell of the first RAT. In some aspects, the UE 605 may determine that the second RAT is available in the cell based at least in part on performing a cell search. For example, the UE 605 may determine that the second RAT is available in the cell when the cell search detects at least one available cell of the second RAT. In some aspects, the cell search may scan NR Absolute Radio Frequency Channel Numbers (NR ARFCNs) (e.g., 5G RFCNs) associated with a registered public land mobile network (PLMN) associated with the cell. In some aspects, the NR ARFCNs may be identified in a frequency list stored by the UE 605, as described in more detail elsewhere herein.

Additionally, or alternatively, the UE 605 may determine that the second RAT is available in the cell based at least in part on receiving system information that indicates that the second RAT is available in the cell. For example, the UE 605 may receive a SIB (e.g., SIB1 or another SIB) that includes an indication that 5G is available in the LTE cell. Additionally, or alternatively, the UE 605 may determine that the second RAT is available in the cell based at least in part on receiving system information that indicates one or more available frequencies of the second RAT in the cell. For example, the UE 605 may receive a SIB (e.g., SIB22 or another SIB) that indicates one or more 5G frequencies available in the LTE cell, which can support NSA mode. In some aspects, the system information may be received from a base station.

Additionally, or alternatively, the UE 605 may determine that the second RAT is available in the cell based at least in part on receiving one or more measurement objects associated with the second RAT. For example, a base station of an LTE cell may transmit one or more 5G measurement objects in the LTE cell, which may indicate one or more 5G resources to be measured and/or reported by the UE 605.

Additionally, or alternatively, the UE 605 may determine that the second RAT is available in the cell based at least in part on determining that the cell is not associated with any restrictions relating to the second RAT. For example, the UE 605 may determine that a 5G RAT restriction is not indicated in an attach accept message or a tracking area update accept message for the cell (e.g., for a registered PLMN of the cell), may determine that the UE 605 is not in a limited service mode (e.g., due to an expired subscriber identity module (SIM) and/or the like), may determine that the UE 605 is not in a barred cell (e.g., the UE 605 is not barred from communicating due to traffic overload in the cell), may determine that the UE 605 is not in an out of service state and/or is not in a radio link failure state, may determine that the UE 605 is not camped on a 2G or a 3G cell, may determine that the 5G RAT is not operating in only a standalone mode in the cell (e.g., may determine that 5G frequencies identified in a SIB can be used in non-standalone mode), and/or the like.

In some aspects, the UE 605 may store the CGI in the first list 610 if the cell search succeeds for the second RAT (e.g., if the UE 605 identifies at least one 5G frequency with a signal parameter that satisfies a threshold), or if the UE 605 receives system information that indicates that the second RAT is available in the cell, or if the UE 605 receives system information that indicates one or more available frequencies of the second RAT in the cell. In some aspects, if at least one of the above conditions is satisfied, and the UE 605 determines that there are no restrictions on the second RAT in the cell, then the UE 605 may store the CGI in the first list 610 to indicate that the second RAT is available in the cell of the first RAT. For example, in the case where the LTE cell has an example CGI of "CGI 5," the UE 605 may store "CGI 5" in the first list 610, as shown by reference number 635.

As shown by reference number 640, in some aspects, the UE 605 may determine that the second RAT is unavailable in the cell of the first RAT. In some aspects, the UE 605 may determine that the second RAT is unavailable in the cell based at least in part on performing a cell search. For example, the UE 605 may determine that the second RAT is unavailable in the cell when a configured number of cell searches fail to detect at least one available cell of the second RAT (e.g., 1 cell search, 2 cell searches, 3 cell searches, 4 cell searches, 5 cell searches, and/or the like).

Additionally, or alternatively, the UE 605 may determine that the second RAT is unavailable in the cell based at least in part on failing to receive system information that indicates that the second RAT is available in the cell. Additionally, or alternatively, the UE 605 may determine that the second RAT is unavailable in the cell based at least in part on failing to receive system information that indicates one or more available frequencies of the second RAT in the cell. Additionally, or alternatively, the UE 605 may determine that the second RAT is unavailable in the cell based at least in part on failing to receive one or more measurement objects associated with the second RAT in the cell.

Additionally, or alternatively, the UE 605 may determine that the second RAT is unavailable in the cell based at least in part on determining that the cell is associated with at least one restriction relating to the second RAT. For example, the UE 605 may determine that a 5G RAT restriction has been indicated in an attach accept message or a tracking area update accept message for the cell, may determine that the UE 605 is in a limited service mode, may determine that the UE 605 is in a barred cell, may determine that the UE 605 is in an out of service state and/or is in a radio link failure state, may determine that the UE 605 is camped on a 2G or a 3G cell, may determine that the 5G RAT is operating in only a standalone mode in the cell (e.g., may determine that 5G frequencies identified in a SIB cannot be used in non-standalone mode), and/or the like.

In some aspects, the UE 605 may store the CGI in the second list 615 if the cell search fails for the second RAT (e.g., if a configured number of consecutive searches fail), and if the UE 605 has not received system information that indicates that the second RAT is available in the cell, and if the UE 605 has not received system information that indicates one or more available frequencies of the second RAT in the cell. In some aspects, if any of the above conditions are not satisfied (e.g., which would indicate that the second RAT is available in the cell), but the UE 605 determines that there is a restriction on the second RAT in the cell, then the UE 605 may store the CGI in the second list 615 to indicate that the second RAT is unavailable in the cell of the first RAT.

As shown by reference number 645, in some aspects, the UE 605 may move a CGI from the first list 610 to the second list 615 if the second RAT is available in the cell and then later becomes unavailable in the cell (e.g., if the condition(s) described above in connection with reference number 640 are satisfied). For example, a cell search may initially succeed and may later fail for the second RAT, the UE 605 may initially receive system information with an indication that the second RAT is available in the cell and the indication may later be removed from the system information, the UE 605 may initially receive system information with an indication of one or more available frequencies of the second RAT in the cell and the indication may later be removed from the system information, the cell may initially not be associated with any restrictions on the second RAT and a restriction may later be introduced, and/or the like.

Similarly, as shown by reference number 650, in some aspects, the UE 605 may move a CGI from the second list 615 to the first list 610 if the second RAT is unavailable in the cell and then later becomes available in the cell (e.g., if the condition(s) described above in connection with reference number 630 are satisfied). For example, a cell search may initially fail and may later succeed for the second RAT, the UE 605 may initially receive system information without an indication that the second RAT is available in the cell and the indication may later be added to the system information, the UE 605 may initially receive system information without an indication of one or more available frequencies of the second RAT in the cell and the indication may later be added to the system information, the cell may initially be associated with a restriction on the second RAT and the restriction may later be removed, and/or the like.

As shown by reference number 655, the UE 605 may display an icon indicating availability of the second RAT when the cell on which the UE 605 is camped is identified in the first list 610 (e.g., when the second RAT is determined to be available in the cell). In this case, the icon is shown as the text "5G/NR," but another icon may be used. In some aspects, the UE 605 may display an icon indicating availability and/or signal strength of both the first RAT and the second RAT. In some aspects, the UE 605 may display an icon indicating availability and/or signal strength of the second RAT, which may imply availability of the second RAT. In this way, a user and/or an application of the UE 605 may be able to determine that the second RAT is available. In some aspects, the UE 605 may provide information relating to the availability of the second RAT (e.g., the availability, the signal strength, and/or the like) to an application executing on the UE 605.

As shown by reference number 660, the UE 605 may not display an icon indicating availability of the second RAT when the cell on which the UE 605 is camped is identified in the second list 615 (e.g., when the second RAT is determined to be unavailable in the cell). In this case, the UE 605 may display only an icon relating to the first RAT, shown as the text "4G/LTE." In some aspects, another icon may be used. In some aspects, the UE 605 may display an icon indicating unavailability of the second RAT, such as the text "5G/NR" displayed with strikethrough (e.g., a line over the text), with an X, and/or the like. In this way, a user and/or an application of the UE 605 may be able to determine that the second RAT is unavailable.

As described in more detail below, in some aspects, the UE 605 may perform a periodic search and measurement procedure associated with the second RAT when the UE 605 is camped on a cell of the first RAT in which the second RAT is available (e.g., when the CGI of the cell is stored in the first list 610). The periodic search and measurement procedure may be used to update display of an icon relating to the second RAT (e.g., if the second RAT changes from available to unavailable, if the second RAT changes from unavailable to available, if a signal strength of the second RAT changes, and/or the like).

In some aspects, the UE 605 may not perform the periodic search and measurement procedure associated with the second RAT when the UE 605 is camped on a cell of the first RAT in which the second RAT is unavailable (e.g., when the CGI of the cell is stored in the second list 615). Alternatively, when the second RAT is unavailable in the cell, the UE 605 may perform the periodic search and measurement procedure less frequently (e.g., once per day, once per week, once per month, and/or the like) as compared to when the second RAT is available in the cell. In this way, the UE 605 may conserve battery power and network resources when the second RAT is unavailable in the cell of the first RAT.

As indicated above, FIG. 6 is provided merely as an example. Other examples are possible and may differ from what was described with regard to FIG. 6.

Figure 7:
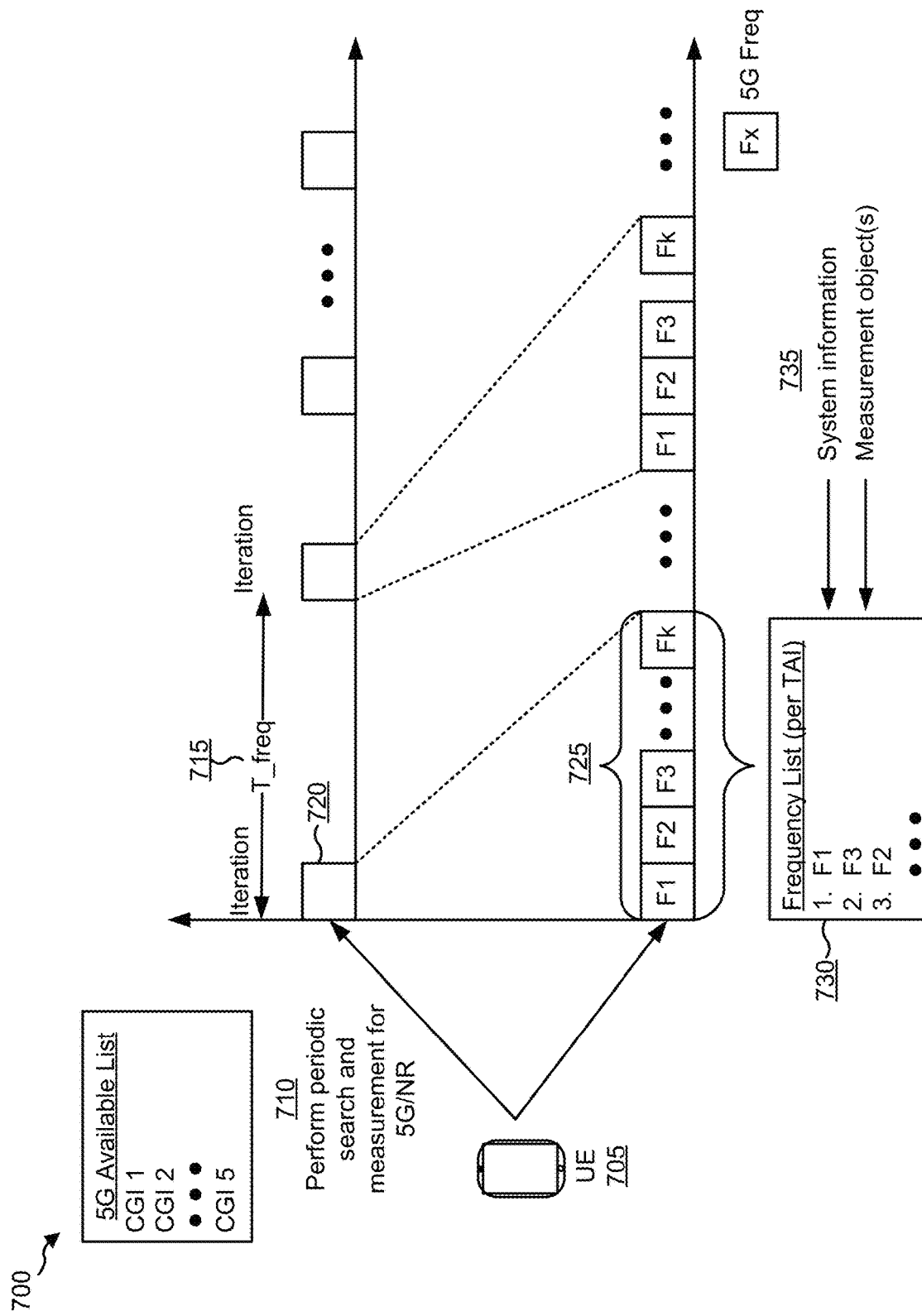

FIG. 7 is a diagram illustrating another example 700 of search, measurement, and icon display in New Radio nonstandalone mode, in accordance with various aspects of the present disclosure. As shown in FIG. 7, a UE 705 may perform a search and measurement procedure to determine 5G availability and/or signal strength in the non-standalone mode. In some aspects, the UE 705 may correspond to one or more UEs described elsewhere herein, such as the UE 120, the UE 505, the UE 605, and/or the like.

As shown by reference number 710, the UE 705 may perform a periodic search and measurement associated with the second RAT (e.g., the 5G/NR RAT). In some aspects, the UE 705 may perform the periodic search and measurement associated with the second RAT when the UE 705 is camped on a cell of the first RAT and the second RAT is determined to be available in the cell, as described above in connection with FIG. 6.

As shown by reference number 715, the UE 705 may configure a timer (shown as "T_freq") that triggers an iteration 720 of the periodic search and measurement. In some aspects, the timer may be configured with a different duration based at least in part on whether the second RAT is determined to be available in the cell (e.g., the cell is identified in the first list 610 of FIG. 6) or the second RAT has not yet been determined to be available or unavailable in the cell (e.g., the cell is not identified in either the first list 610 or the second list 615 of FIG. 6). For example, the timer may be configured with a shorter duration when the second RAT has not yet been determined to be available or unavailable in the cell, and may be configured with a longer duration when the second RAT is determined to be available in the cell. In this way, the UE 705 may more quickly determine whether the second RAT is available or unavailable in the cell.

In some aspects, a duration of the timer may be modified based at least in part on a result of an iteration 720 of the periodic search and measurement. For example, when an iteration 720 of the periodic search and measurement fails (e.g., does not identify at least one cell of the second RAT with a signal parameter that satisfies a threshold), the duration of the timer may be maintained, or may be increased (e.g., iteratively up to a maximum duration) to conserve battery power of the UE 705. In some aspects, when an iteration 720 of the periodic search and measurement succeeds (e.g., identifies at least one cell of the second RAT with a signal parameter that satisfies a threshold), then the duration of the timer may be maintained, or may be decreased (e.g., iteratively until a minimum duration is reached).

In some aspects, the timer may be suspended or resumed based at least in part on whether a display of the UE is off or on, as described in more detail below in connection with FIG. 8. In some aspects, a duration of the timer may be configured based at least in part on a data rate associated with the UE 705, as described in more detail below in connection with FIG. 9.

As shown by reference number 725, during an iteration 720 of the periodic search and measurement, the UE 705 may scan one or more frequencies for the second RAT (e.g., one or more NR ARFCNs), shown as frequencies F1 through Fk. In some aspects, the UE 705 may scan an entire radio frequency (RF) spectrum. Additionally, or alternatively, the UE 705 may begin scanning the RF spectrum during an iteration 720 of the periodic search and measurement, and may terminate the iteration 720 based at least in part on determining that a condition is satisfied. By terminating the iteration 720 before scanning the entire RF spectrum, the UE 705 conserves battery power.

For example, the condition may be that the UE 705 has detected at least one cell of the second RAT with a signal parameter that satisfies a threshold. The signal parameter may be, for example, a reference signal received power (RSRP) parameter, a reference signal received quality (RSRQ) parameter, a received signal strength indicator (RSSI) parameter, a signal energy parameter, and/or the like. In some aspects, the threshold may be configured based at least in part on a remaining battery power of the UE 705. For example, the threshold may be higher for higher remaining battery power, and may be lower for lower remaining battery power to balance conservation of battery power of UE 705 and finding a better frequency of the second RAT.

Additionally, or alternatively, the condition may be that the UE 705 has detected at least one cell of the second RAT with a signal parameter that satisfies a threshold after scanning a configured number of frequencies. In some aspects, the number of frequencies may be configured based at least in part on a remaining battery power of the UE 705. For example, the number may be larger for higher remaining battery power, and may be smaller for lower remaining battery power to balance conservation of battery power of UE 705 and finding a better frequency of the second RAT. Additionally, or alternatively, the UE 705 may scan different portions of the entire RF spectrum during different iterations 720 to conserve battery power.

As shown by reference number 730, the UE 705 may store a frequency list that indicates one or more frequencies (e.g., NR ARFCNs) on which the second RAT is available in the cell of the first RAT. In some aspects, the one or more frequencies may be identified based at least in part on a cell search for the second RAT (e.g., an iteration 720 of the periodic cell search and measurement), as shown. For example, if the UE 705 identifies a frequency of the second RAT with a signal parameter that satisfies a threshold, then the UE 705 may store the frequency (e.g., the NR ARFCN of the frequency) in the frequency list. Additionally, or alternatively, as shown by reference number 735, the one or more frequencies may be identified and/or added to the frequency list based at least in part on system information that indicates at least one available frequency of the second RAT in the cell, one or more measurement objects that are associated with the second RAT and are received in the cell, and/or the like.

In some aspects, the frequency list may store one or more frequencies on a per-tracking area identity (TAI) basis. For example, a group of cells may belong to a tracking area, and one or more frequencies of the second RAT that are available in one or more cells of the tracking area may be stored in the frequency list in association with the tracking area (e.g., using a TAI). In this case, the UE 705 may determine a TAI of the cell on which the UE 705 is camped, and may store the one or more frequencies in association with the TAI. In this way, memory of the UE 705 may be conserved that would otherwise be used to store a per-cell frequency list. However, in some aspects, the frequency list may store one or more frequencies on a per-cell basis to improve accuracy.

In some aspects, the UE 705 may sort the frequencies stored in the frequency list based at least in part on measured signal parameters corresponding to the frequencies. For example, a first frequency with a better signal parameter (e.g., a higher RSRP and/or the like) may receive a higher priority in the frequency list than a second frequency with a worse signal parameter (e.g., a lower RSRP and/or the like). In some aspects, the UE 705 may perform an iteration 720 of the periodic search and measurement according to a sequence in which the frequencies are sorted in the frequency list. In the above example, the UE 705 may scan the first frequency before scanning the second frequency. In some aspects, this may prevent the UE 705 from scanning the second frequency, such as when the first frequency has a signal parameter that satisfies a threshold, thereby terminating the iteration 720 and conserving battery power of the UE 705. Further, this may increase the speed at which the UE 705 obtains measurement results and/or updates an indication associated with the second RAT for display on the UE 705.

In some aspects, an indication of whether the second RAT is available is presented for display on the UE 705 based at least in part on a result of an iteration 720 of the periodic search and measurement. In some aspects, the indication includes a signal strength indicator that is displayed based at least in part on one or more signal parameters measured during the iteration 720. For example, the signal strength indicator may represent the best signal strength measured by the UE 705 when scanning one or more frequencies. In this way, the UE 705 may indicate a signal strength of a frequency of the second RAT most likely to be used by the UE 705 to communicate.

As indicated above, FIG. 7 is provided merely as an example. Other examples are possible and may differ from what was described with regard to FIG. 7.

Figure 8:
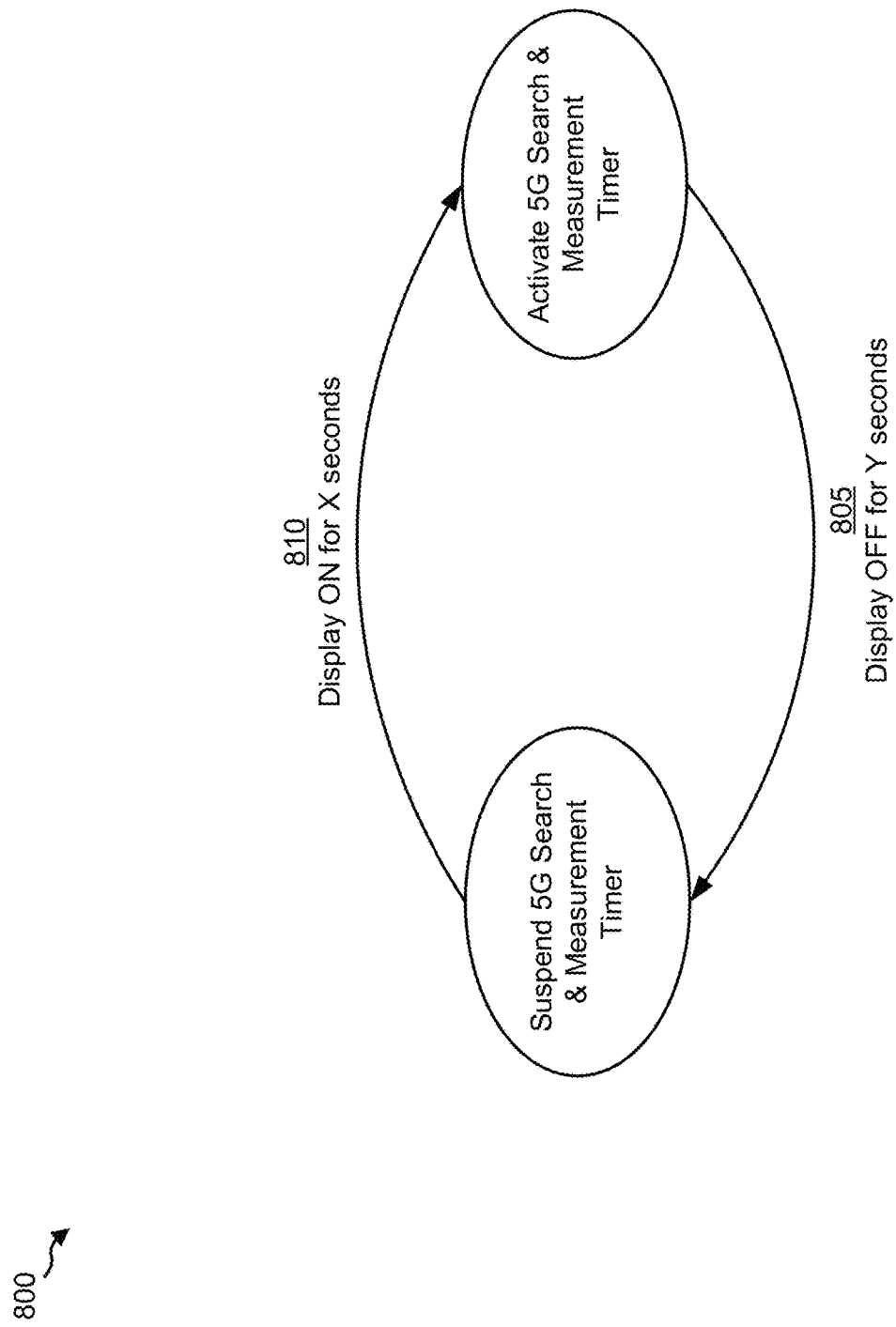

FIG. 8 is a diagram illustrating another example 800 of search, measurement, and icon display in New Radio non-standalone mode, in accordance with various aspects of the present disclosure.

As shown in FIG. 8, and by reference number 805, a UE may suspend a timer that triggers a periodic search and measurement (e.g., the T_freq timer of FIG. 7) based at least in part on a determination that a display of the UE is off. In some aspects, the UE may suspend the timer based at least in part on determining that the display of the UE has been off for a threshold amount of time (e.g., Y seconds). Alternatively, the UE may permit the timer to run, but if the timer expires while the display is off, then the UE may wait until the display is turned on to perform the periodic search and measurement.

Additionally, or alternatively, the UE may suspend the timer based at least in part on a determination that the display is off and the UE is in a radio resource control (RRC) idle mode. In this way, the periodic search and measurement may continue to occur if the UE is in an RRC connected mode and is actively transmitting or receiving data, which may be affected by a result of the search and measurement.

As shown by reference number 810, the UE may resume the timer based at least in part on a determination that a display of the UE is on. In some aspects, the UE may resume the timer based at least in part on determining that the display of the UE has been on for a threshold amount of time (e.g., X seconds).

In this way, the UE may conserve battery power by suspending the periodic search and measurement that updates a display of the UE when the display of the UE is off.

As indicated above, FIG. 8 is provided merely as an example. Other examples are possible and may differ from what was described with regard to FIG. 8.

Figure 9:
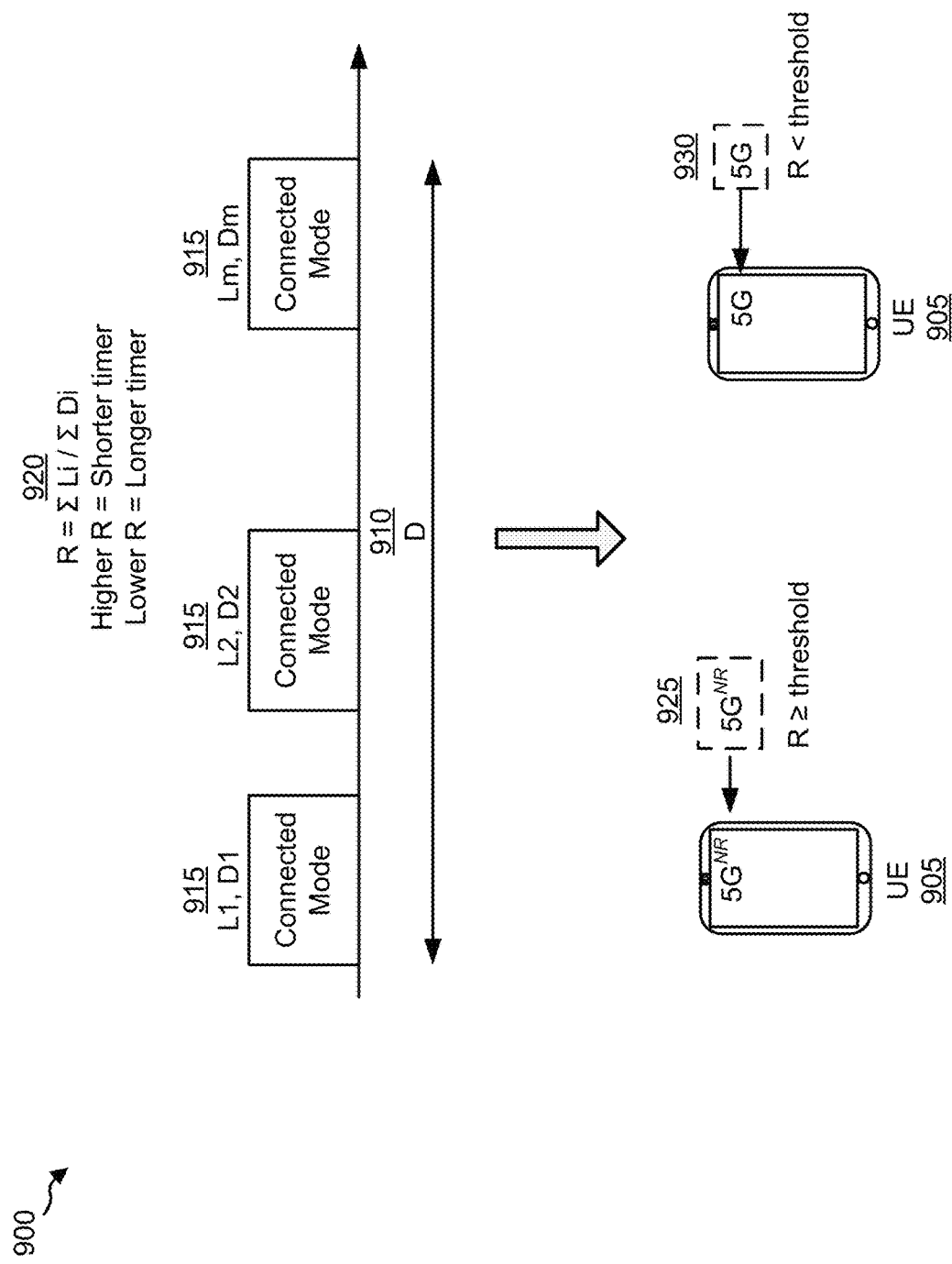

FIG. 9 is a diagram illustrating another example 900 of search, measurement, and icon display in New Radio non-standalone mode, in accordance with various aspects of the present disclosure. As shown in FIG. 9, a UE 905 may configure a duration of a timer that triggers periodic search and measurement (e.g., a "T_freq" timer, as described elsewhere herein) based at least in part on a data rate associated with the UE 905. Additionally, or alternatively, the UE 905 may display an indication of whether the second RAT is available in a cell of the first RAT in a different manner based at least in part on a data rate associated with the UE 905. In some aspects, the UE 905 may correspond to one or more UEs described elsewhere herein, such as the UE 120, the UE 505, the UE 605, the UE 705, and/or the like.

In some aspects, the UE 905 may determine and/or estimate a data rate of the UE 905, and may configure the timer based at least in part on the data rate. For example, the UE 905 may determine a number of bytes (shown as Li) transmitted and/or received by the UE 905 over a time period 910 (shown as D) (e.g., a configured number of minutes, a configured number of hours, a configured number of days, and/or the like). In some aspects, the number of bytes Li may represent a number of bytes transmitted and/or received in a connected mode, and the UE 905 may determine a total amount of time Di that the UE 905 was in the connected mode during the time period 910.

For example, and as shown by reference number 915, the UE 905 may transmit and/or receive L1 bytes during a first connected mode time period D1, may transmit and/or receive L2 bytes during a second connected mode time period D2, may transmit and/or receive Lm bytes during an $m^{th}$ connected mode Dm, and/or the like. As shown by reference number 920, the UE 905 may determine a data rate R by dividing the total number of bytes transmitted and/or received while in the connected mode (e.g., Li, which may be calculated as the sum of L1, L2, . . . , Lm) by the total amount of time that the UE 905 was in the connected mode (e.g., Di, which may be calculated as the sum of D1, D2, . . . , Dm).

The UE 905 may configure a shorter duration for the timer for a higher data rate (e.g., a higher value of R), and may configure a longer duration for the timer for a lower data rate (e.g., a lower value of R). For example, the UE 905 may configure a shorter timer duration if the data rate satisfies a threshold, and may configure a longer timer duration if the data rate does not satisfy a threshold. In some aspects, the UE 905 may configure the timer to one of multiple possible durations by comparing the data rate to multiple thresholds.

As another example, the UE 905 may determine and/or estimate a data rate of the UE 905 associated with a single connected mode occurrence. For example, after an RRC connection is released for a connected mode occurrence, the UE 905 may divide the number of bytes transmitted and/or received during the connected mode occurrence (e.g., Lj) by the duration of the connected mode occurrence (e.g., Dj) to determine the data rate R (e.g., R=Lj/Dj). The UE 905 may configure the timer based at least in part on the data rate, as described above. Additionally, or alternatively, the UE 905 may apply weights to multiple connected mode occurrences to determine the data rate (e.g., using a weighted combination of data rates over multiple connected mode occurrences, using a weighted average data rate, using a moving average data rate, and/or the like).

In this way, the availability and/or signal strength of the second RAT may be updated more frequently and more accurately indicated when the UE 905 is communicating more frequently and/or with a higher data rate, and battery power of the UE 905 may be conserved when the UE 905 is communicating less frequently and/or with a lower data rate.

As further shown in FIG. 9, an indication of whether the second RAT is available may be displayed differently based at least in part on a data rate associated with the UE 905. For example, as shown by reference number 925, if the data rate satisfies a threshold (e.g., is greater than or equal to the threshold), then the indication may be displayed in a first manner. In example 900, this indication is shown as the text "5G$^{NR}$," but another indication may be used. As shown by reference number 930, if the data rate does not satisfy a threshold (e.g., is less than the threshold), then the indication may be displayed in a second manner. In example 900, this indication is shown as the text "5G," but another indication may be used. In this way, a user and/or an application of the UE 905 may be capable of quickly determining whether a 5G RAT is being used in a 4G cell due to a higher likelihood of the 5G RAT being used when the data rate is high.

As indicated above, FIG. 9 is provided merely as an example. Other examples are possible and may differ from what was described with regard to FIG. 9.

Figure 10:
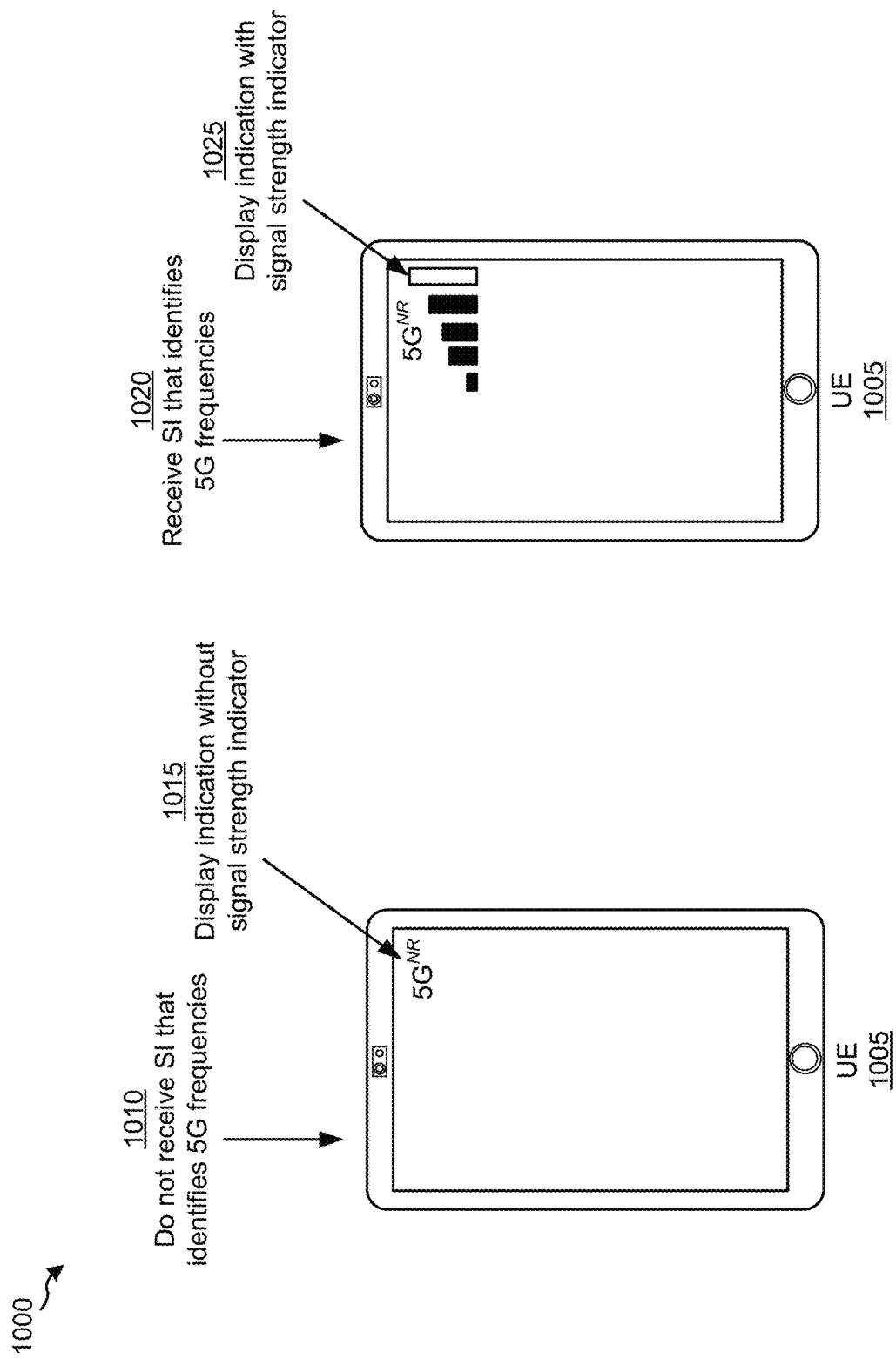

FIG. 10 is a diagram illustrating another example 1000 of search, measurement, and icon display in New Radio non-standalone mode, in accordance with various aspects of the present disclosure. As shown in FIG. 10, a UE 1005 may display an indication of whether the second RAT is available in a cell of the first RAT in a different manner based at least in part on whether the UE 1005 has received system information associated with the second RAT in the cell. In some aspects, the UE 1005 may correspond to one or more UEs described elsewhere herein, such as the UE 120, the UE 505, the UE 605, the UE 705, the UE 905, and/or the like.

As shown by reference number 1010, in some aspects, the UE 1005 may not receive system information that identifies one or more frequencies on which the second RAT (e.g., a 5G/NR RAT) is available in the cell of the first RAT (e.g., a 4G/LTE RAT). However, the UE 1005 may receive system information that indicates that the second RAT is available in the cell (e.g., but not the frequencies on which the second RAT is available in the cell). In this case, the UE 1005 may display the indication in a first manner. For example, as shown by reference number 1015, the UE 1005 may display the indication without a signal strength indicator (e.g., signal strength bars). For example, the UE 1005 may display the text "5G$^{NR}$" without a signal strength indicator.

As shown by reference number 1020, in some aspects, the UE 1005 may receive system information that identifies one or more frequencies on which the second RAT is available in the cell of the first RAT (e.g., in addition to receiving system information that indicates that the second RAT is available in the cell). In this case, the UE 1005 may display the indication in a second manner. For example, as shown by reference number 1025, the UE 1005 may display the indication with a signal strength indicator (e.g., signal strength bars). For example, the UE 1005 may display the text "5G$^{NR}$" with a signal strength indicator.

In some aspects, the UE 1005 may not perform a search and measurement procedure unless the UE 1005 receives system information that identifies one or more frequencies on which the second RAT is available in the cell of the first RAT. In this way, the UE 1005 may conserve battery power by preventing the search and measurement for the second RAT when there is a lower likelihood of the second RAT being available (e.g., because system information associated with the second RAT was not received).

As indicated above, FIG. 10 is provided merely as an example. Other examples are possible and may differ from what was described with regard to FIG. 10.

Figure 11:
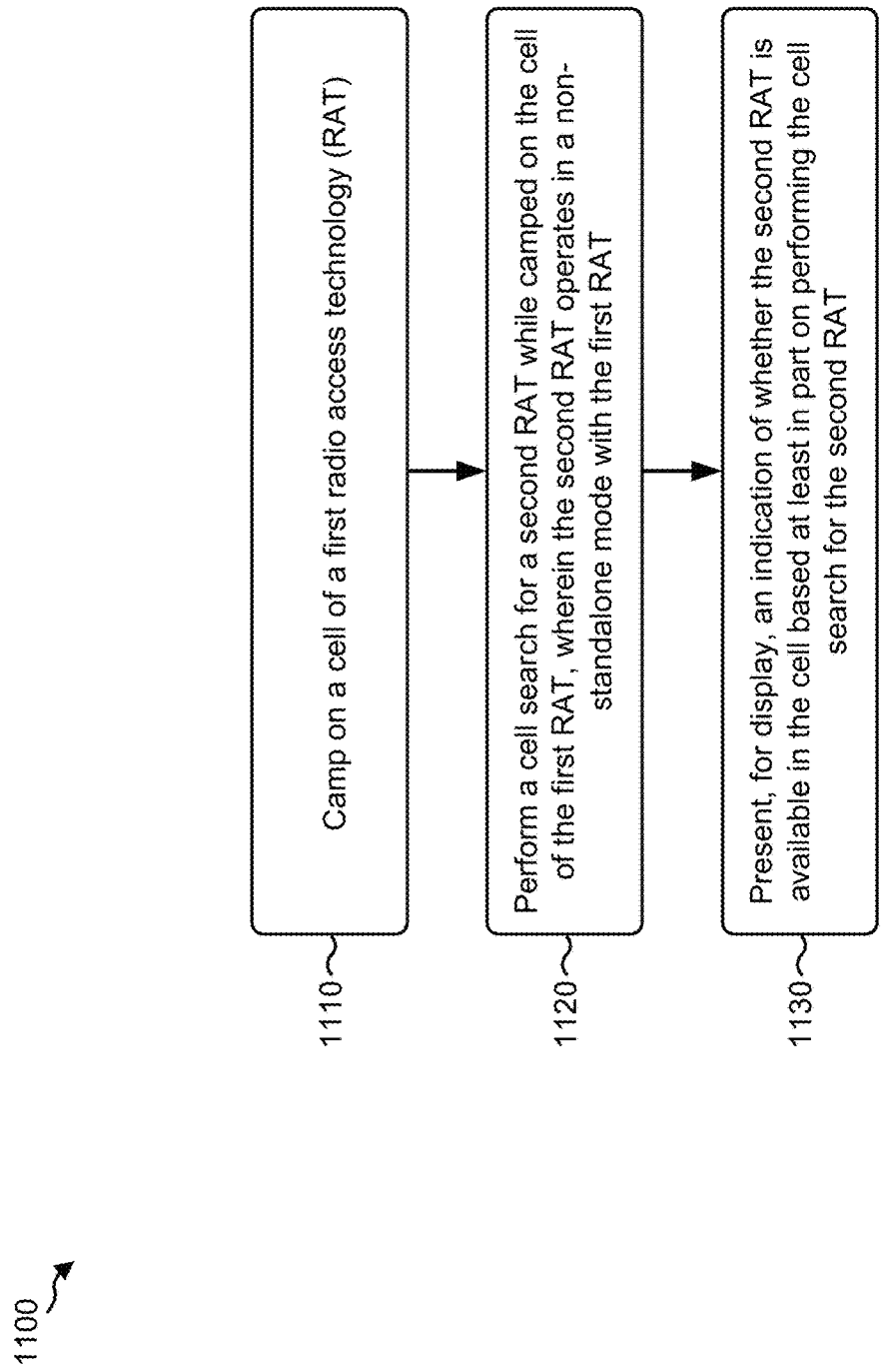
FIG. 11 is a diagram illustrating an example process performed, for example, by a user equipment, in accordance with various aspects of the present disclosure.

FIG. 11 is a diagram illustrating an example process 1100 performed, for example, by a UE, in accordance with various aspects of the present disclosure. Example process 1100 is an example where a UE (e.g., the UE 120, the UE 505, the UE 605, the UE 705, the UE 905, the UE 1005, and/or the like) performs search, measurement, and icon display in New Radio non-standalone mode, in accordance with various aspects of the present disclosure.

As shown in FIG. 11, in some aspects, process 1100 may include camping on a cell of a first radio access technology (RAT) (block 1110). For example, the UE may camp on a cell of a first RAT (e.g., a 4G/LTE RAT), as described in more detail above in connection with FIGS. 5-10.

As further shown in FIG. 11, in some aspects, process 1100 may include performing a cell search for a second RAT while camped on the cell of the first RAT, wherein the second RAT operates in a non-standalone mode with the first RAT (block 1120). For example, the UE may perform a cell search for a second RAT (e.g., a 5G/NR RAT) while camped on the cell of the first RAT, as described in more detail above in connection with FIGS. 5-10. In some aspects, the second RAT operates in a non-standalone mode with the first RAT.

As further shown in FIG. 11, in some aspects, process 1100 may include presenting, for display, an indication of whether the second RAT is available in the cell based at least in part on performing the cell search for the second RAT (block 1130). For example, the UE may present, for display, an indication of whether the second RAT is available in the cell based at least in part on performing the cell search for the second RAT, as described in more detail above in connection with FIGS. 5-10.

In some aspects, the first RAT is a Long Term Evolution RAT used to anchor a network connection associated with the UE on a master cell group and the second RAT is a New Radio RAT used to add at least one carrier to the network connection on a secondary cell group.

In some aspects, a cell global identity of the cell is stored in a first list when the second RAT is determined to be available in the cell, or is stored in a second list when the second RAT is determined to be unavailable in the cell, wherein the first list identifies one or more cells of the first RAT in which the second RAT is available, and wherein the second list identifies one or more cells of the first RAT in which the second RAT is unavailable. In some aspects, an icon indicating availability of the second RAT is displayed when the cell on which the UE is camped is identified in the first list, and is not displayed when the cell on which the UE is camped is identified in the second list.

In some aspects, the second RAT is determined to be available in the cell when the cell search detects at least one available cell of the second RAT. In some aspects, the second RAT is determined to be unavailable in the cell when a configured number of cell searches fail to detect at least one available cell of the second RAT.

In some aspects, the second RAT is determined to be available or unavailable based at least in part on: the cell search for the second RAT, whether system information is received that indicates that the second RAT is available in the cell, whether system information is received that indicates one or more available frequencies of the second RAT in the cell, whether one or more measurement objects associated with the second RAT are received in the cell, a determination of whether the cell is associated with one or more restrictions relating to the second RAT in the cell, or some combination thereof. In some aspects, the determination of whether the cell is associated with the one or more restrictions is based at least in part on one or more of: whether an indication that the second RAT is restricted in the cell is included in an attach accept message or a tracking area update accept message, whether the UE is in a limited service mode or a barred cell, whether the UE is in an out of service state or a radio link failure state, whether the UE is camped on a 2G or a 3G cell, whether an indication is received that the second RAT is operating in only a stand-alone mode in the cell, or some combination thereof.

In some aspects, a periodic search and measurement associated with the second RAT is not performed in the cell when the second RAT is determined to be unavailable in the cell. In some aspects, a periodic search and measurement associated with the second RAT is performed in the cell when the second RAT is determined to be available in the cell. In some aspects, a timer that triggers an iteration of the periodic search and measurement is suspended based at least in part on a determination that a display of the UE is off. In some aspects, the timer is resumed based at least in part on a determination that the display is on.

In some aspects, a timer that triggers an iteration of the periodic search and measurement is configured with a different duration based at least in part on whether the second RAT is determined to be available in the cell or the second RAT has not yet been determined to be available or unavailable in the cell. In some aspects, a duration of a timer that triggers an iteration of the periodic search and measurement is modified based at least in part on a result of a prior iteration of the periodic search and measurement. In some aspects, a duration of a timer that triggers an iteration of the periodic search and measurement is configured based at least in part on a data rate associated with the UE. In some aspects, an iteration of the periodic search and measurement is terminated based at least in part on detection of at least one cell of the second RAT with a signal parameter that satisfies a threshold.

In some aspects, one or more frequencies on which the second RAT is available in the cell are stored in a frequency list, and wherein the one or more frequencies are identified based at least in part on: the cell search for the second RAT, system information that indicates at least one available frequency of the second RAT in the cell, one or more measurement objects that are associated with the second RAT and are received in the cell, or some combination thereof. In some aspects, the one or more frequencies are stored on a per-tracking area identity basis and are stored based at least in part on a tracking area identity associated with the cell.

In some aspects, the one or more frequencies are sorted in the frequency list based at least in part on one or more measured signal parameters corresponding to the one or more frequencies. In some aspects, an iteration of a periodic search and measurement associated with the second RAT is performed according to a sequence in which the one or more frequencies are sorted in the frequency list. In some aspects, the indication of whether the second RAT is available includes a signal strength indicator that is displayed based at least in part on the one or more measured signal parameters.

In some aspects, the indication of whether the second RAT is available is displayed differently based at least in part on a data rate associated with the UE. In some aspects, the indication of whether the second RAT is available is displayed differently based at least in part on whether system information is received that identifies one or more frequencies on which the second RAT is available in the cell. In some aspects, the indication includes a signal strength indicator when the system information is received and does not include a signal strength indicator when the system information is not received.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   camping on a cell of a first radio access technology (RAT);
   performing a cell search for a second RAT while camped on the cell of the first RAT, wherein the second RAT operates in a non-standalone (NSA) mode with the first RAT; and
   presenting, for display, an indication of whether the second RAT is available in the cell based at least in part on performing the cell search for the second RAT;
   wherein a periodic search and measurement associated with the second RAT is performed in the cell when the second RAT is determined to be available in the cell; and
   wherein a timer that triggers an iteration of the periodic search and measurement is configured with a different duration based at least in part on whether the second RAT is:
   determined to be available in the cell, or
   has not yet been determined to be available or unavailable in the cell.

2. The method of claim 1, wherein the first RAT is a Long Term Evolution RAT used to anchor a network connection associated with the UE on a master cell group and the second RAT is a New Radio RAT used to add at least one carrier to the network connection on a secondary cell group.

3. The method of claim 1, wherein a cell global identity of the cell is stored in a first list when the second RAT is determined to be available in the cell, or is stored in a second list when the second RAT is determined to be unavailable in the cell,
   wherein the first list identifies one or more cells of the first RAT in which the second RAT is available, and
   wherein the second list identifies one or more cells of the first RAT in which the second RAT is unavailable.

4. The method of claim 3, wherein an icon indicating availability of the second RAT is displayed when the cell on which the UE is camped is identified in the first list, and is not displayed when the cell on which the UE is camped is identified in the second list.

5. The method of claim 1, wherein the second RAT is determined to be available in the cell when the cell search detects at least one available cell of the second RAT, or wherein the second RAT is determined to be unavailable in the cell when a configured number of cell searches fail to detect at least one available cell of the second RAT.

6. The method of claim 1, wherein the second RAT is determined to be available or unavailable based at least in part on:
   the cell search for the second RAT,
   whether system information is received that indicates that the second RAT is available in the cell,
   whether system information is received that indicates one or more available frequencies of the second RAT in the cell,
   whether one or more measurement objects associated with the second RAT are received in the cell,
   a determination of whether the cell is associated with one or more restrictions relating to the second RAT in the cell, or
   some combination thereof.

7. The method of claim 6, wherein the determination of whether the cell is associated with the one or more restrictions is based at least in part on one or more of:
   whether an indication that the second RAT is restricted in the cell is included in an attach accept message or a tracking area update accept message,
   whether the UE is in a limited service mode or a barred cell,
   whether the UE is in an out of service state or a radio link failure state,
   whether the UE is camped on a 2G or a 3G cell,
   whether an indication is received that the second RAT is operating in only a standalone mode in the cell, or
   some combination thereof.

8. The method of claim 1, wherein the periodic search and measurement associated with the second RAT is not performed in the cell when the second RAT is determined to be unavailable in the cell.

9. A method of wireless communication performed by a user equipment (UE), comprising:
   camping on a cell of a first radio access technology (RAT);
   performing a cell search for a second RAT while camped on the cell of the first RAT, wherein the second RAT operates in a non-standalone (NSA) mode with the first RAT; and presenting, for display, an indication of whether the second RAT is available in the cell based at least in part on performing the cell search for the second RAT;
wherein a periodic search and measurement associated with the second RAT is performed in the cell when the second RAT is determined to be available in the cell; and
wherein a timer that triggers an iteration of the periodic search and measurement is suspended based at least in part on a determination that a display of the UE is off, or wherein the timer is resumed based at least in part on a determination that the display is on.

10. The method of claim 9, wherein a duration of the timer that triggers the iteration of the periodic search and measurement is modified based at least in part on a result of a prior iteration of the periodic search and measurement, or wherein the duration of the timer is configured based at least in part on a data rate associated with the UE.

11. The method of claim 9, wherein an iteration of the periodic search and measurement is terminated based at least in part on detection of at least one cell of the second RAT with a signal parameter that satisfies a threshold.

12. The method of claim 1, wherein one or more frequencies on which the second RAT is available in the cell are stored in a frequency list, and wherein the one or more frequencies are identified based at least in part on:
the cell search for the second RAT,
system information that indicates at least one available frequency of the second RAT in the cell,
one or more measurement objects that are associated with the second RAT and are received in the cell, or
some combination thereof.

13. The method of claim 12, wherein the one or more frequencies are stored on a per-tracking area identity basis and are stored based at least in part on a tracking area identity associated with the cell.

14. The method of claim 12, wherein the one or more frequencies are sorted in the frequency list based at least in part on one or more measured signal parameters corresponding to the one or more frequencies.

15. The method of claim 14, wherein an iteration of a periodic search and measurement associated with the second RAT is performed according to a sequence in which the one or more frequencies are sorted in the frequency list.

16. The method of claim 14, wherein the indication of whether the second RAT is available includes a signal strength indicator that is displayed based at least in part on the one or more measured signal parameters.

17. The method of claim 1, wherein the indication of whether the second RAT is available is displayed differently based at least in part on at least one of:
a data rate associated with the UE,
whether system information is received that identifies one or more frequencies on which the second RAT is available in the cell, or
a combination thereof.

18. A method of wireless communication performed by a user equipment (UE), comprising:
camping on a cell of a first radio access technology (RAT);
performing a cell search for a second RAT while camped on the cell of the first RAT, wherein the second RAT operates in a non-standalone (NSA) mode with the first RAT; and
presenting, for display, an indication of whether the second RAT is available in the cell based at least in part on performing the cell search for the second RAT;
wherein the indication of whether the second RAT is available is displayed differently based at least in part on at least one of:
a data rate associated with the UE,
whether system information is received that identifies one or more frequencies on which the second RAT is available in the cell, or
a combination thereof; and
wherein the indication:
includes a signal strength indicator when the system information is received; and
does not include a signal strength indicator when the system information is not received.

19. A user equipment (UE) for wireless communication, comprising:
a memory; and
one or more processors coupled to the memory, the memory and the one or more processors configured to:
camp on a cell of a first radio access technology (RAT);
perform a cell search for a second RAT while camped on the cell of the first RAT, wherein the second RAT operates in a non-standalone mode with the first RAT; and
present, for display, an indication of whether the second RAT is available in the cell based at least in part on performing the cell search for the second RAT;
wherein a cell global identity of the cell is stored in:
a first list when the second RAT is determined to be available in the cell, or
a second list when the second RAT is determined to be unavailable in the cell,
wherein the first list identifies one or more cells of the first RAT in which the second RAT is available, and
wherein the second list identifies one or more cells of the first RAT in which the second RAT is unavailable;
wherein an icon indicating availability of the second RAT is displayed when the cell on which the UE is camped is identified in the first list, and is not displayed when the cell on which the UE is camped is identified in the second list.

20. The UE of claim 19, wherein a periodic search and measurement associated with the second RAT is not performed in the cell when the second RAT is determined to be unavailable in the cell, or wherein the periodic search and measurement associated with the second RAT is performed in the cell when the second RAT is determined to be available in the cell.

21. An apparatus for wireless communication, comprising;
means for camping on a cell of a first radio access technology (RAT);
means for performing a cell search for a second RAT while camped on the cell of the first RAT, wherein the second RAT operates in a non-standalone mode with the first RAT; and
means for presenting, for display, an indication of whether the second RAT is available in the cell based at least in part on performing the cell search for the second RAT;
wherein a periodic search and measurement associated with the second RAT is performed in the cell when the second RAT is determined to be available in the cell; and
wherein a timer that triggers an iteration of the periodic search and measurement is configured with a different duration based at least in part on whether the second RAT is:

determined to be available in the cell, or has not yet been determined to be available or unavailable in the cell.

22. The apparatus of claim 21, wherein a cell global identity of the cell is stored in a first list when the second RAT is determined to be available in the cell, or is stored in a second list when the second RAT is determined to be unavailable in the cell, wherein the first list identifies one or more cells of the first RAT in which the second RAT is available, and wherein the second list identifies one or more cells of the first RAT in which the second RAT is unavailable.

23. The apparatus of claim 21, wherein the periodic search and measurement associated with the second RAT is not performed in the cell when the second RAT is determined to be unavailable in the cell.

24. A user equipment (UE) for wireless communication, comprising:

a memory; and one or more processors coupled to the memory, the memory and the one or more processors configured to:

camp on a cell of a first radio access technology (RAT);

perform a cell search for a second RAT while camped on the cell of the first RAT, wherein the second RAT operates in a non-standalone mode with the first RAT; and present, for display, an indication of whether the second RAT is available in the cell based at least in part on performing the cell search for the second RAT;

wherein a periodic search and measurement associated with the second RAT is performed in the cell when the second RAT is determined to be available in the cell; and wherein a timer that triggers an iteration of the periodic search and measurement is configured with a different duration based at least in part on whether the second RAT is:

determined to be available in the cell, or has not yet been determined to be available or unavailable in the cell.

25. The UE of claim 24, wherein one or more frequencies on which the second RAT is available in the cell are stored in a frequency list, and wherein the one or more frequencies are identified based at least in part on:

the cell search for the second RAT, system information that indicates at least one available frequency of the second RAT in the cell, one or more measurement objects that are associated with the second RAT and are received in the cell, or some combination thereof.

26. The UE of claim 25, wherein the one or more frequencies are stored on a per-tracking area identity basis and are stored based at least in part on a tracking area identity associated with the cell.

27. The UE of claim 25, wherein the one or more frequencies are sorted in the frequency list based at least in part on one or more measured signal parameters corresponding to the one or more frequencies.

28. A user equipment (UE) for wireless communication, comprising:

a memory; and one or more processors coupled to the memory, the memory and the one or more processors configured to:

camp on a cell of a first radio access technology (RAT);

perform a cell search for a second RAT while camped on the cell of the first RAT, wherein the second RAT operates in a non-standalone mode with the first RAT; and present, for display, an indication of whether the second RAT is available in the cell based at least in part on performing the cell search for the second RAT;

wherein the indication of whether the second RAT is available is displayed differently based at least in part on at least one of:

a data rate associated with the UE, whether system information is received that identifies one or more frequencies on which the second RAT is available in the cell, or a combination thereof; and wherein the indication:

includes a signal strength indicator when the system information is received; and does not include a signal strength indicator when the system information is not received.

29. The UE of claim 28, wherein the first RAT is a Long Term Evolution RAT used to anchor a network connection associated with the UE on a master cell group and the second RAT is a New Radio RAT used to add at least one carrier to the network connection on a secondary cell group.

30. The UE of claim 28, wherein the second RAT is determined to be available in the cell when the cell search detects at least one available cell of the second RAT, or wherein the second RAT is determined to be unavailable in the cell when a configured number of cell searches fail to detect at least one available cell of the second RAT.

* * * * *